United States Patent
Al-Olayan et al.

(10) Patent No.: US 11,242,728 B2
(45) Date of Patent: Feb. 8, 2022

(54) NANOPARTICLE-BASED SHEAR-THICKENING MATERIALS

(71) Applicants: Saudi Arabian Oil Company, Dhahran (SA); Massachusetts Institute of Technology, Cambridge, MA (US)

(72) Inventors: Abeer Mohammad Saleh Al-Olayan, Dammam (SA); Alfredo Alexander-Katz, Cambridge, MA (US); Jason R. Cox, Ashland, MA (US)

(73) Assignees: Saudi Arabian Oil Company, Dhahran (SA); Massachusetts Institute of Technology, Cambridge, MA (US)

(*) Notice: Subject to any disclaimer, the term of this patent is extended or adjusted under 35 U.S.C. 154(b) by 168 days.

(21) Appl. No.: 16/654,678

(22) Filed: Oct. 16, 2019

(65) Prior Publication Data

US 2020/0048984 A1    Feb. 13, 2020

Related U.S. Application Data

(62) Division of application No. 15/812,720, filed on Nov. 14, 2017, now Pat. No. 10,480,281.

(Continued)

(51) Int. Cl.
*C09K 8/42* (2006.01)
*E21B 33/14* (2006.01)
(Continued)

(52) U.S. Cl.
CPC ............. *E21B 33/14* (2013.01); *C04B 24/42* (2013.01); *C04B 28/02* (2013.01);
(Continued)

(58) Field of Classification Search
CPC ....... C04B 24/42; C04B 14/06; C04B 20/008; C04B 24/32; C04B 28/02; C04B 40/0039;
(Continued)

(56) References Cited

U.S. PATENT DOCUMENTS

| 656,981 A | 8/1900 | Johnson |
| 4,289,203 A | 9/1981 | Swanson |

(Continued)

FOREIGN PATENT DOCUMENTS

| CA | 2663726 | 3/2008 |
| CN | 102899894 | 1/2013 |

(Continued)

OTHER PUBLICATIONS

Gulf Cooperation Council Examination Report issued in GCC Application No. GC 2017-34264 dated Mar. 27, 2019, 4 pages.

(Continued)

*Primary Examiner* — Alicia Bland
(74) *Attorney, Agent, or Firm* — Fish & Richardson P.C.

(57) ABSTRACT

A composition includes an aqueous colloidal dispersion of a nanomaterial. The nanomaterial includes, disposed on a surface of the nanomaterial, a first coupling agent including silane and a functional group including an amino acid. The nanomaterial includes, disposed on the surface of the nanomaterial, a second coupling agent including silane and a polymer with a molecular weight between 1,000 and 20,000.

9 Claims, 6 Drawing Sheets

Related U.S. Application Data (60) Provisional application No. 62/422,250, filed on Nov. 15, 2016.

(51) Int. Cl.
| | | |
|---|---|---|
| *C04B 28/02* | (2006.01) | |
| *C04B 40/00* | (2006.01) | |
| *C04B 24/42* | (2006.01) | |
| *C09K 8/516* | (2006.01) | |
| *C09K 8/506* | (2006.01) | |
| *C09K 8/467* | (2006.01) | |
| *C09K 8/588* | (2006.01) | |

(52) U.S. Cl.
CPC ............ *C04B 40/0039* (2013.01); *C09K 8/42* (2013.01); *C09K 8/467* (2013.01); *C09K 8/506* (2013.01); *C09K 8/516* (2013.01); *C09K 8/588* (2013.01); *C09K 2208/10* (2013.01)

(58) Field of Classification Search
CPC ...... C09K 2208/10; C09K 8/42; C09K 8/467; C09K 8/506; C09K 8/516; C09K 8/588; E21B 33/14
See application file for complete search history.

(56) References Cited

U.S. PATENT DOCUMENTS

| | | | |
|---|---|---|---|
| 4,694,046 A | 9/1987 | Bock et al. | |
| 8,448,885 B2* | 5/2013 | Nelson | .................. B82Y 30/00 241/21 |
| 2002/0026000 A1 | 2/2002 | Varadaraj et al. | |
| 2003/0220204 A1 | 11/2003 | Baran, Jr. et al. | |
| 2009/0071368 A1* | 3/2009 | Steingrover | .............. C09C 3/12 106/35 |
| 2009/0173253 A1 | 7/2009 | Roesch et al. | |
| 2010/0068523 A1* | 3/2010 | Williams | ................... B01J 2/30 428/403 |
| 2014/0162911 A1* | 6/2014 | Monastiriotis | ......... C09K 8/805 507/221 |
| 2014/0323361 A1 | 10/2014 | Livanec et al. | |
| 2015/0001385 A1 | 1/2015 | Perriat et al. | |
| 2016/0251571 A1 | 9/2016 | Agrawal et al. | |

FOREIGN PATENT DOCUMENTS

| | | |
|---|---|---|
| CN | 103160265 A | 6/2013 |
| CN | 105601953 | 5/2016 |
| EP | 1404776 B1 | 11/2012 |
| WO | WO1999038931 | 8/1999 |
| WO | WO2002102917 A2 | 12/2002 |
| WO | WO03100214 | 12/2003 |
| WO | WO2008034553 A1 | 3/2008 |
| WO | WO2014179020 A1 | 11/2014 |

OTHER PUBLICATIONS

International Search Report and Written Opinion in International Application No. PCT/US2017/061588, dated Jan. 23, 2018, 13 pages.
Gulf Cooperation Council Examination Report issued in GCC Application No. GC 2017-34264 dated Jul. 29, 2019, 3 pages.
CN Office Action in Chinese Appln. No. CN 201780069527, dated Jul. 15, 2021, 10 pages, with English Translation.

* cited by examiner

NANOPARTICLE-BASED SHEAR-THICKENING MATERIALS

CROSS-REFERENCE TO RELATED APPLICATIONS

This disclosure is a divisional application of U.S. application Ser. No. 15/812,720 filed on Nov. 14, 2017 and which claims the benefit of priority to U.S. Application Ser. No. 62/422,250 entitled "Nanoparticle-Based Shear-Thickening Materials", which was filed on Nov. 15, 2016, the entire contents of both of which are incorporated herein by reference.

TECHNICAL FIELD

This specification relates to shear-thickening materials for use in oilfield applications, for example, for aiding in hydrocarbon extraction from subterranean zones.

BACKGROUND

Non-Newtonian fluids can have properties of a liquid and of a solid. Unlike Newtonian fluids, the viscosity of non-Newtonian fluids can vary with shear rate. Shear rate is a velocity gradient measured across the diameter of a fluid-flow channel, such as a pipe or an annulus. Dilatant fluids are non-Newtonian fluids that exhibit shear-thickening behavior. In other words, the viscosity of a dilatant fluid increases with increasing shear rate. Non-Newtonian fluids are complex and can be useful in oilfield applications. Integrating non-Newtonian fluid mechanics with reservoir characteristics can improve hydrocarbon recovery in various stages of the lifespan of a producing reservoir.

SUMMARY

The present disclosure describes technologies relating to aqueous colloidal dispersions of nanomaterials. Certain aspects of the subject matter described here can be implemented as a composition including an aqueous colloidal dispersion of a nanomaterial. The nanomaterial includes, disposed on a surface of the nanomaterial, a first coupling agent including silane and a functional group including an amino acid, and a second coupling agent including silane and a polymer with a molecular weight between 1,000 and 20,000.

This, and other aspects, can include one or more of the following features. The amino acid can be a polar amino acid.

The polymer can be polyethylene glycol or polyethylene oxide.

The aqueous colloidal dispersion can be a shear-thickening material.

A potential of hydrogen (pH) of the aqueous colloidal dispersion can be in a range of 9 to 10.

Heating the aqueous colloidal dispersion to a temperature above 90 degrees Celsius (° C.) can cause a viscosity of the aqueous colloidal dispersion to reversibly increase by a factor of 1.5 to 15.

Applying a shear on the aqueous colloidal dispersion can cause a viscosity of the aqueous colloidal dispersion to reversibly increase by a factor of 1.1 to 3.

A ratio between the first coupling agent and the second coupling agent disposed on the surface of the nanomaterial can be between 1:1 and 20:1.

The nanomaterial can include silica nanoparticles having an average particle size of equal to or less than approximately 1 micrometer (μm).

The silica nanoparticles can have an average particle size in a range of 60 nanometers (nm) to 1,000 nm.

Certain aspects of the subject matter described here can be implemented as a method. A nanomaterial is formed, in which an average particle size of the nanomaterial is equal to or less than approximately 1 μm. Forming the nanomaterial includes disposing, on a surface of a silica nanoparticle, a first coupling agent including silane and a functional group including an amino acid and disposing, on the surface of the silica nanoparticle, a second coupling agent including silane and a polymer with a molecular weight between 1,000 and 20,000. The nanomaterial is dispersed in a fluid including water to form an aqueous colloidal dispersion.

This, and other aspects, can include one or more of the following features. The amino acid can be a polar amino acid.

The polymer can be polyethylene glycol or polyethylene oxide.

The aqueous colloidal dispersion can be a shear-thickening material.

A ratio between the first coupling agent and the second coupling agent disposed on the surface of the silica nanoparticle can be between 1:1 and 20:1.

Certain aspects of the subject matter described here can be implemented as a method which includes introducing an aqueous colloidal dispersion to a subterranean zone. The aqueous colloidal dispersion includes a nanomaterial including, disposed on a surface of the nanomaterial, a first coupling agent including silane and a functional group including an amino acid and a second coupling agent including silane and a polymer with a molecular weight between 1,000 and 20,000.

This, and other aspects, can include one or more of the following features. A ratio between the first coupling agent and the second coupling agent disposed on the surface of the nanomaterial can be between 1:1 and 20:1.

The aqueous colloidal dispersion can be mixed with a cement before introducing the aqueous colloidal dispersion to the subterranean zone.

The aqueous colloidal dispersion can be a shear-thickening material, and applying a shear on the aqueous colloidal dispersion can cause a viscosity of the aqueous colloidal dispersion to reversibly increase by a factor of 1.1 to 3.

Heating the aqueous colloidal dispersion to above 90° C. can cause a viscosity of the aqueous colloidal dispersion to reversibly increase by a factor of 1.5 to 15.

The details of one or more implementations of the subject matter of this specification are set forth in the accompanying drawings and the description. Other features, aspects, and advantages of the subject matter will become apparent from the description, the drawings, and the claims.

DETAILED DESCRIPTION

A shear-thickening material (also referred as a dilatant material) is a material in which viscosity increases with an increasing rate of shear strain or applied shear stress. Any increase in viscosity due to shear is reversible, such that the viscosity decreases when the shear is reduced or stopped. A shear-gelling material is a material that can form a gel when shear stress is applied. Similarly, any gel formed due to shear is reversible, such that the gel disappears or is destroyed when the shear is reduced or stopped. Such materials can be useful in oilfield applications, such as in drilling, well or reservoir treatment, hydraulic fracturing, completions, and enhancing hydrocarbon recovery.

This disclosure describes aqueous colloidal dispersions (also referred as colloids) of nanomaterials, such as silica ($SiO_2$) nanoparticles, that can viscosify under shear or can produce or form a gel under shear. Silica nanoparticles can be grafted with polymers that exhibit shear-gelling and shear-thickening properties. There are various factors that can affect the viscosity of such fluids, that is, aqueous colloidal dispersions of nanomaterials. For example, an increase in concentration of nanomaterials or an increase in molecular weight of the polymers grafted onto the nanomaterials can increase the viscosity of the colloidal dispersion. A way to improve the shear-thickening capability of such colloids is to introduce charged (that is, having a positive or negative charge) moieties along the backbone of the polymers grafted onto the nanomaterials. The charged nature of the polymer backbone can lead to intramolecular electrostatic repulsions between the moieties along the backbone and intermolecular electrostatic repulsions between polymers grafted on the same silica nanoparticle or neighboring silica nanoparticles, thereby increasing the hydrodynamic volume of the polymer coil, which can increase the viscosity of the colloid.

The subject matter described in this specification can be implemented in particular implementations, so as to realize one or more of the following advantages. The compositions described in this disclosure can be used as shear-thickening materials. During drilling of a well, the shear-thickening material can be used to prevent unwanted flow, such as lost circulation when drilling mud flows into a formation without returning to the surface. The use of shear-thickening material can ensure safe operation and prevent or mitigate the possibility of upsets that can result in costly losses in production and repairs. For example, the shear-thickening material can be used as a blowout preventer to deal with any extreme, erratic pressures or uncontrolled flow, such as when a gas cap is reached during drilling. The shear-thickening material can be used as a cement additive to delay hardening of the cement. During enhanced oil recovery, the shear-thickening material can be used to increase the viscosity of an injection fluid, thereby preventing or mitigating the potential of fingering, which can result in premature water breakthrough.

Figure 1:
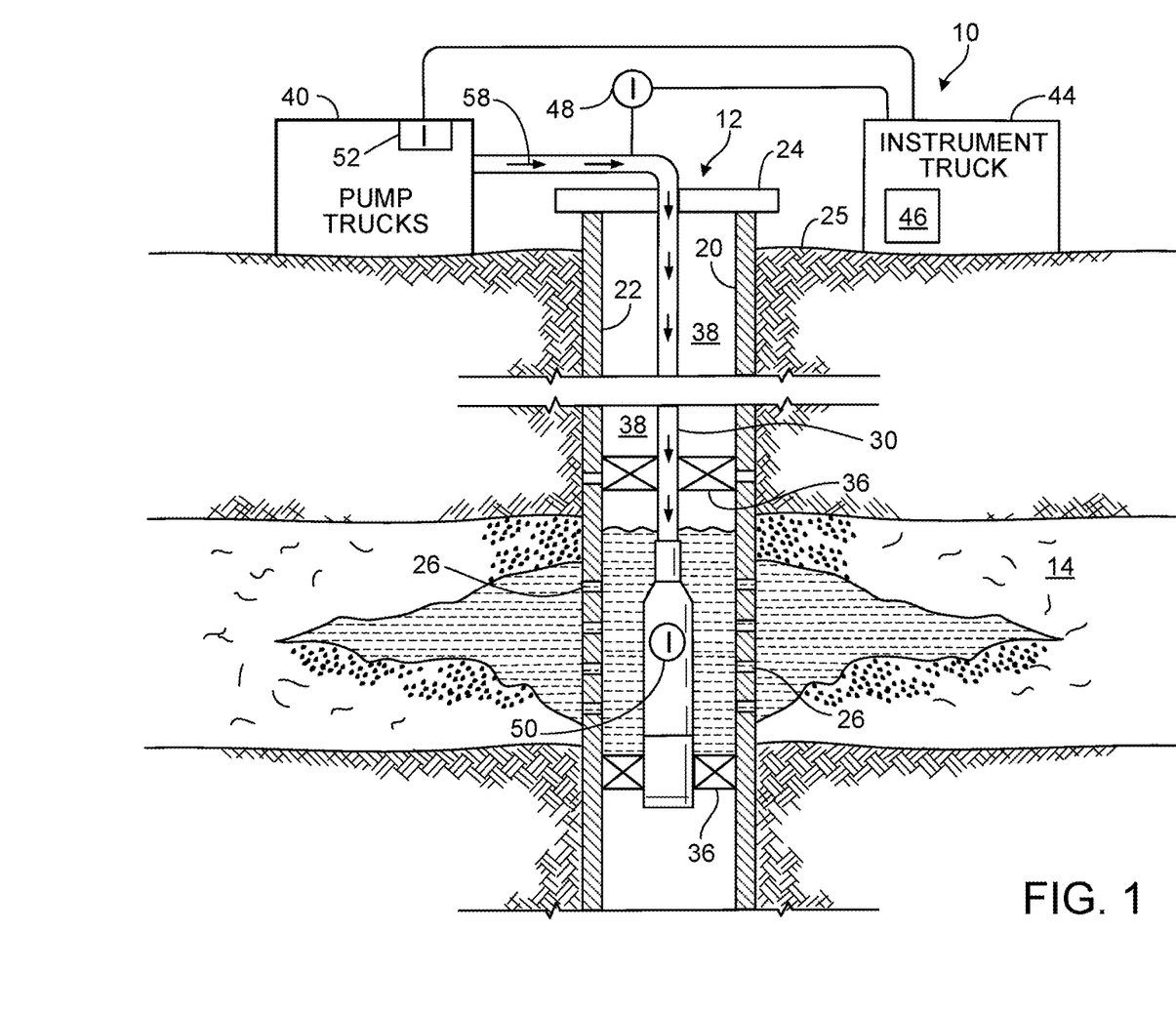
FIG. 1 is an example of a well.

FIG. 1 illustrates an example of a hydrocarbon extraction system 10 including a well 12. The well 12 can be in a wellbore 20 formed in a subterranean zone 14. The subterranean zone 14 can include, for example, a formation, a portion of a formation, or multiple formations in a hydrocarbon-bearing reservoir from which recovery operations can be practiced to recover trapped hydrocarbons. In some implementations, the subterranean zone 14 includes an underground formation of naturally fractured rock containing hydrocarbons (for example, oil, gas, or both). For example, the subterranean zone 14 can include a fractured shale. In some implementations, the well 12 can intersect other suitable types of formations, including reservoirs that are not naturally fractured in any significant amount.

The well 12 can include a casing 22 and well head 24. The wellbore 20 can be a vertical, horizontal, deviated, or multilateral bore. The casing 22 can be cemented or otherwise suitably secured in the well bore 12. Perforations 26 can be formed in the casing 22 at the level of the subterranean zone 14 to allow oil, gas, and by-products to flow into the well 12 and be produced to the surface 25. Perforations 26 can be formed using shape charges, a perforating gun or otherwise. In some cases, the well 12 is completed openhole without a casing.

A work string 30 can be disposed in the well bore 20. The work string 30 can be coiled tubing, sectioned pipe or other suitable tubing. Packers 36 can seal an annulus 38 of the well bore 20 uphole of and down hole of the subterranean zone 14. Packers 36 can be mechanical, fluid inflatable or other suitable packers. One or more pump trucks 40 can be coupled to the work string 30 at the surface 25. The pump trucks 40 pump fluid 58 down the work string 30, for example, to pump cement into the well bore 20. The pump trucks 40 can include mobile vehicles, equipment such as skids or other suitable structures.

One or more instrument trucks 44 can also be provided at the surface 25. The instrument truck 44 can include a control system 46. The control system 46 can monitor and control the pump trucks 40 and fluid valves, for example, to stop and start pumping fluid into the well bore 20. The control system 46 communicates with surface and subsurface instruments to monitor and control a process, such as a well treatment process. In some implementations, the surface and subsurface instruments include surface sensors 48, down-hole sensors 50 and pump controls 52.

This description describes compositions that can be used as shear-thickening materials in a well bore 20 formed in a subterranean zone 14. The compositions can include an aqueous colloidal dispersion of silica nanoparticles and can be flowed into the subterranean zone (for example, a reservoir). The silica nanoparticles have an average particle size of equal to or less than approximately 1 micrometer (μm). In this specification, "approximately", "approximate", or "approx." means a deviation or allowance of up to 10 percent (%) and any variation from a mentioned value is within the tolerance limits of any machinery used to manufacture the part. The silica nanoparticles can be functionalized with two different coupling agents that each include silane. The coupling agents can be disposed on a surface of the silica nanoparticles by adsorption, chemical reaction, or a combination of these. A first coupling agent can include a polar amino acid, such as histidine, glutamine, asparagine, serine, threonine, tyrosine, cysteine, tryptophan, arginine, lysine, aspartic acid, or glutamic acid. A second coupling agent can include a polymer. The polymer can have a molecular weight that is between 1,000 and 20,000 (units for molecular weight are grams per mole). In some cases, the polymer of the second coupling agent is polyethylene glycol (PEG). In some cases, the polymer of the second coupling agent is polyethylene oxide (PEO). The molecular weight of the polymer of the second coupling agent disposed on the surface of the silica nanoparticles can affect the viscosity of an aqueous colloidal dispersion of such nanoparticles. For example, utilizing a second coupling agent including a polymer with a larger molecular weight can increase the viscosity of the resulting aqueous colloidal dispersion. The nanomaterial (that is, the silica nanoparticles with the first and second coupling agents disposed on their surfaces) can be dispersed in a fluid which includes water to form an aqueous colloidal dispersion. This aqueous colloidal dispersion can be a shear-thickening material. In some implementations, the aqueous colloidal dispersion has a potential of hydrogen (pH) in a range of 9 to 10.

Figure 2:
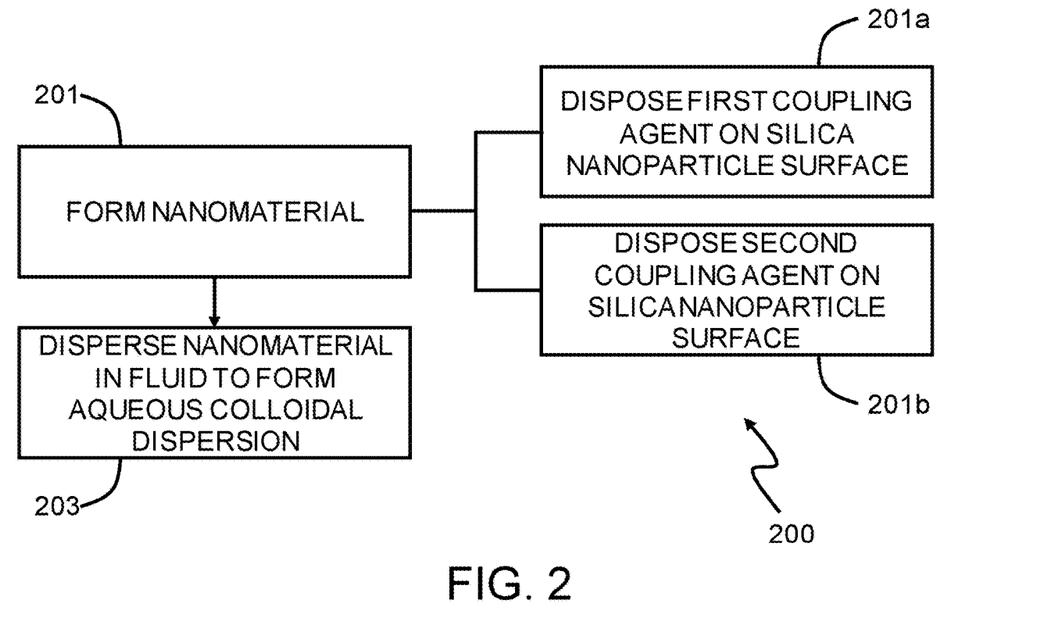
FIG. 2 is a flow chart of an example method for forming an aqueous colloidal dispersion of nanomaterials.

FIG. 2 shows a flow chart for a method 200 for forming an aqueous colloidal dispersion of nanomaterial. At 201, a nanomaterial is formed. The nanomaterial includes silica nanoparticles whose average particle size is equal to or less than approximately 1 Forming the nanomaterial includes at 201a, disposing a first coupling agent on a surface of the silica nanoparticle. The first coupling agent includes silane and a functional group, and the functional group includes an amino acid. In some implementations, the amino acid is a polar amino acid, such as histidine, glutamine, asparagine, serine, threonine, tyrosine, cysteine, tryptophan, arginine, lysine, aspartic acid, or glutamic acid. Forming the nanomaterial includes at 201b, disposing a second coupling agent on the surface of the silica nanoparticle. The second coupling agent includes silane and a polymer with a molecular weight between 1,000 and 20,000. In some implementations, the polymer is PEG. In some implementations, a ratio between the first and second coupling agents disposed on the surface of the silica nanoparticle is between 1:1 and 20:1. For example, the ratio between the first and second coupling agents disposed on the surface of the silica nanoparticle is 19:1, 9:1, 3:1, or 3:2. To dispose the first and second coupling agents on the surface of the silica nanoparticles, the silica nanoparticles can be dispersed in a solvent and then mixed with the first and second coupling agents. An additive can be added to the mixture to alter a pH of the mixture. The pH can be altered in order to promote or accelerate reactions involved with coupling the silanes (that is, of the first and second coupling agents) to the silica nanoparticles. For example, an additive can be added to the mixture to change the pH of the mixture to be in a range of 9 to 10. The mixture can be stirred for sufficient time (for example, approximately 12 hours) to allow the first and coupling agents to dispose on the surface of the silica nanoparticles by adsorption, chemical reaction, or both. After the mixture has been stirred for sufficient time to allow the first and second coupling agents to dispose on the surface of the silica nanoparticles, the silica nanoparticles can be separated from the remaining mixture, for example, by centrifugation, lyophilization (that is, freeze-drying), or combinations of both.

At 203, the nanomaterial is dispersed in a fluid which includes water to form an aqueous colloidal dispersion. The concentration of nanomaterial in the aqueous colloidal dispersion can affect the viscosity of the aqueous colloidal dispersion. For example, increasing the concentration of nanomaterial in the aqueous colloidal dispersion can increase the viscosity of the aqueous colloidal dispersion. The aqueous colloidal dispersion can be introduced to a subterranean zone. For example, the aqueous colloidal dispersion can be pumped into a wellbore formed within a subterranean zone. In some implementations, the aqueous colloidal dispersion is mixed with a cement before introduction to the subterranean zone. The aqueous colloidal dispersion can be a shear-thickening material. Applying a shear on the aqueous colloidal dispersion can cause a viscosity of the aqueous colloidal dispersion to reversibly increase by a factor of 1.1 to 3. Applying a shear can be understood to mean applying any kind of shear, such as applying a shear rate, applying a shear force, or applying a shear stress. For example, an aqueous colloidal dispersion of the nanomaterial described previously (this specific example referred as Colloid A) can have a viscosity of 1 centipoise (cP) when no shear is applied and a viscosity of 3 cP when a shear rate of 450 reciprocal seconds ($s^{-1}$) is applied. Assuming all other conditions remain the same, if the shear rate is stopped, the viscosity of Colloid A can decrease and return to 1 cP. Heating the aqueous colloidal dispersion to a temperature above 90 degrees Celsius (° C.) can cause the viscosity of the aqueous colloidal dispersion to reversibly increase by a factor of 1.5 to 15. For example, Colloid A can have a viscosity of 1 cP at 20° C. and a viscosity of 10 cP at 100° C. Assuming all other conditions remain the same, if the temperature of Colloid A drops below 90° C. (for example, back to 20° C.), the viscosity of Colloid A can decrease and return to 1 cP. The application of shear and heating to a temperature above 90° C. can have a cumulative effect on the viscosity of such aqueous colloidal dispersions of the previously described nanomaterials. For example, Colloid A can have a viscosity of 1 cP at 20° C. when no shear is applied and a viscosity of 30 cP when a shear rate of 450 $s^{-1}$ is applied at 100° C. Assuming all other conditions remain the same, if the temperature of Colloid A drops below 90° C. (for example, back to 20° C.) and the shear rate is stopped, the viscosity of Colloid A can decrease and return to 1 cP.

Figure 3A:
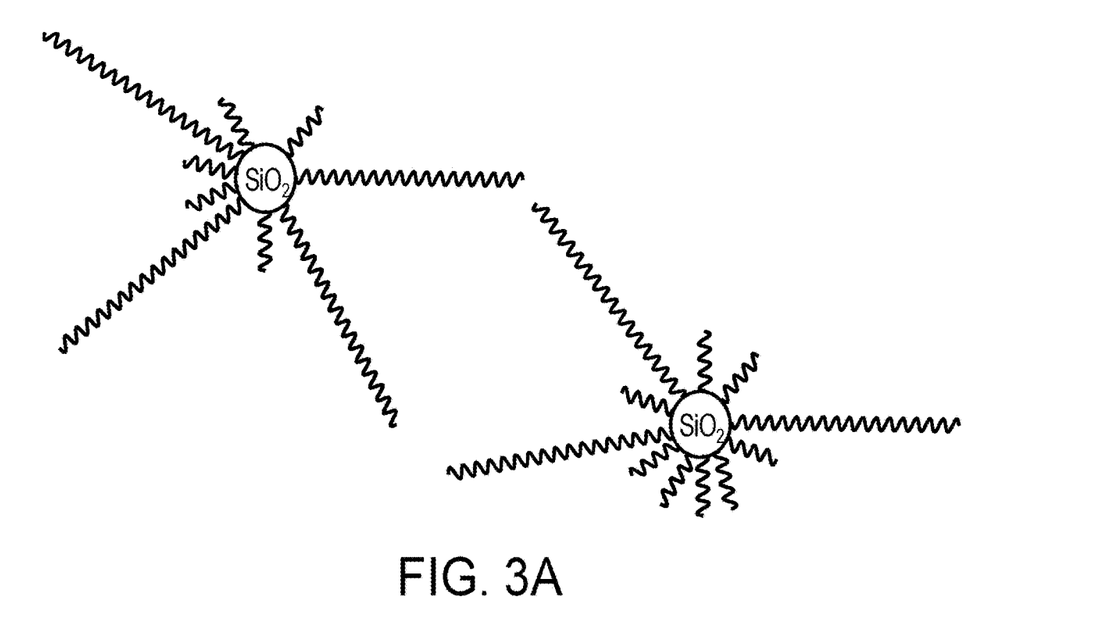
FIGS. 3A and 3B are schematic diagrams of nanomaterial.
Figure 3B:
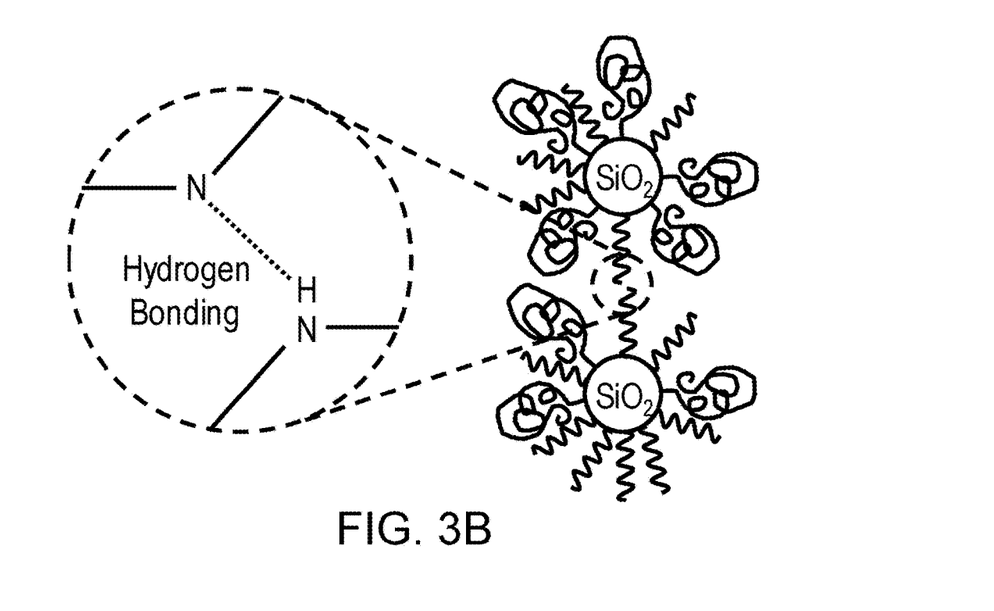
Figure 4A:
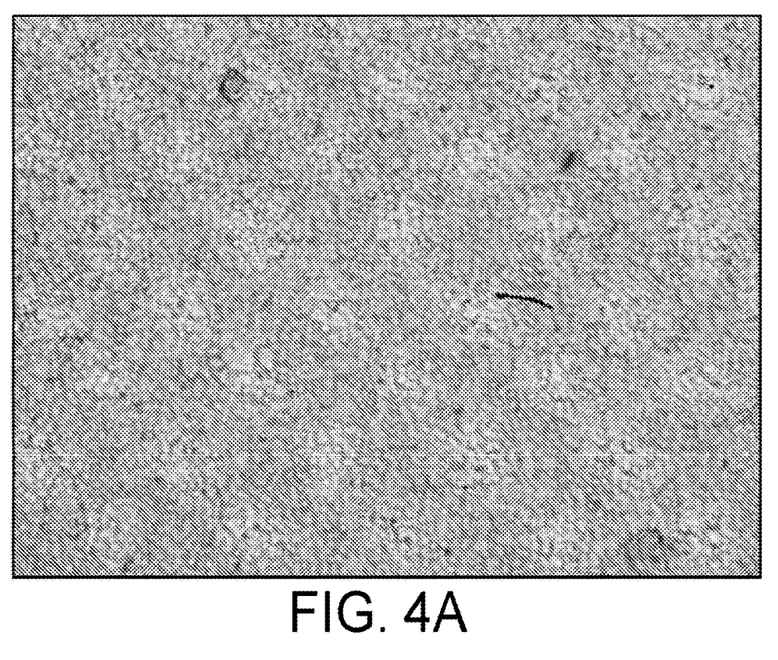
FIGS. 4A and 4B are images of an aqueous colloidal dispersion of nanomaterials.
Figure 4B:
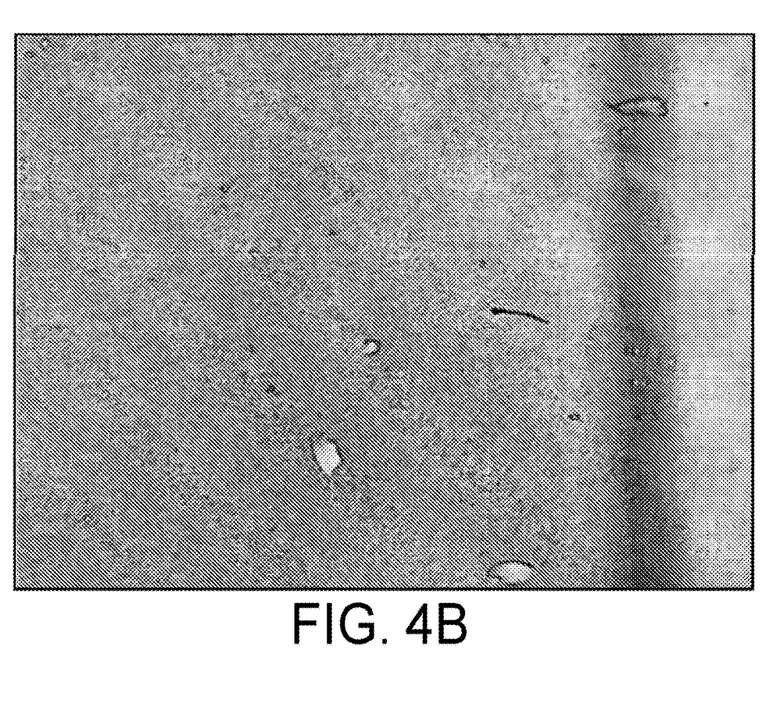

FIGS. 3A and 3B show schematic diagrams of neighboring silica nanoparticles of an aqueous colloidal dispersion as previously described in this description. FIG. 3A shows the silica nanoparticles when no shear is applied to the aqueous colloidal dispersion, and FIG. 3B shows the silica nanoparticles when shear is applied to the aqueous colloidal dispersion. In FIG. 3A, the second coupling agents including a polymer with a molecular weight of 1,000 to 20,000 (depicted by the longer curves attached to the surface of the silica nanoparticles) prevent neighboring silica nanoparticles from associating with each other. In FIG. 3B, the applied shear causes the second coupling agents to collapse, and the polar amino acids of the first coupling agents (depicted by the shorter curves attached to the surface of the silica nanoparticles) can interact and form hydrogen bonding with other first coupling agents on neighboring silica nanoparticles. The interparticle hydrogen bonding can increase the viscosity of the bulk fluid (that is, the aqueous colloidal dispersion of nanomaterial). Stopping or taking away the shear from the aqueous colloidal dispersion can cause the nanoparticles to disassociate from each other, reverting back to what is shown in FIG. 3A, where the polymer chains prevent the nanoparticles from associating with each other. FIGS. 4A and 4B show dynamic light scattering images of an implementation of the aqueous colloidal dispersion of silica nanoparticles described. FIG. 4A shows the colloid when no shear is applied, and FIG. 4B shows the colloid when shear is applied.

Example 1

The first coupling agent was prepared by adding 10 milliliters (mL) of dimethylformamide (DMF) solvent to 1.07 mL of (3-glycidyloxypropyl)trimethoxysilane (1 equivalent) and 1 gram (g) of histidine (1.5 equivalent), along with an excess of sodium carbonate ($Na_2CO_3$). This mixture was stirred for 12 hours at room temperature (approximately 23° C.), so that the first coupling agent including silane and the polar amino acid (histidine) could form.

The second coupling agent included silane and PEG. 2.0 g of 1 µm silica particles were dispersed in 20 mL of ethanol solvent. This dispersion of silica particles in ethanol solvent was utilized as a base fluid in the fluids shown in the following table. The amounts of first and second coupling agents were added to the base fluid and are shown in milligrams (mg) in the following table.

| Fluid number | $1^{st}$ coupling agent | $2^{nd}$ coupling agent | Ratio of $1^{st}$ to $2^{nd}$ coupling agents | Total silane weight % relative to silica |
|---|---|---|---|---|
| #1 | 19 | 1 | approx. 95:5 | 1% |
| #2 | 18 | 2 | approx. 90:10 | 1% |
| #3 | 16 | 4 | approx. 75:25 | 1% |
| #4 | 14 | 6 | approx. 60:40 | 1% |

Figure 5:
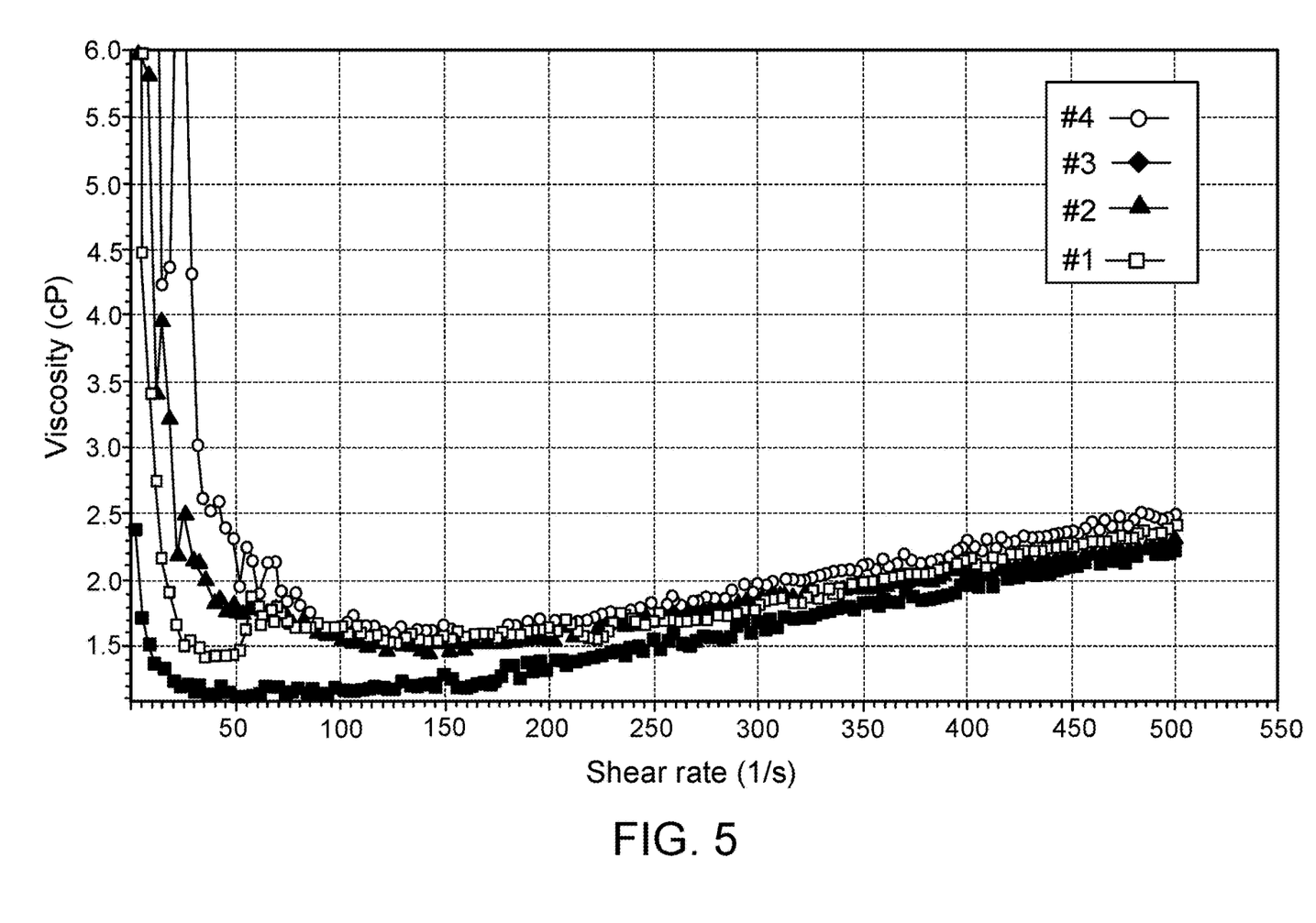
FIG. 5 is a graph of viscosities of various aqueous colloidal dispersions of nanomaterials with various shear rates applied.

To each of the fluids (#1, #2, #3, and #4) shown in the table, 1 mL of water ($H_2O$) was added in order to dissolve the second coupling agent. Acidic acid was added to each fluid, such that the pH of each of the fluids were approximately 4.5. Each of the fluids were sealed and stirred for 12 hours at room temperature (approximately 23° C.). Then, each of the fluids were centrifuged at 5,000 revolutions per minute (rpm) for 5 minutes to cause the precipitate (that is, the silica particles treated with the first and second coupling agents) to separate from the supernatant (that is, the remaining solution), and the supernatant was discarded. The precipitate was re-dispersed in ethanol and centrifuged, again. This procedure of re-dispersing the precipitate in a fluid followed by centrifugation was repeated: three times with ethanol and then two times with water. After the final centrifugation of the precipitate and removal of the supernatant, the silica particles were lyophilized in a freeze dryer overnight in order to remove any residual water. FIG. 5 shows a data graph plotting the viscosities of each of the fluids (#1, #2, #3, and #4) shown in the table at various shear rates.

Example 2

Figure 6:
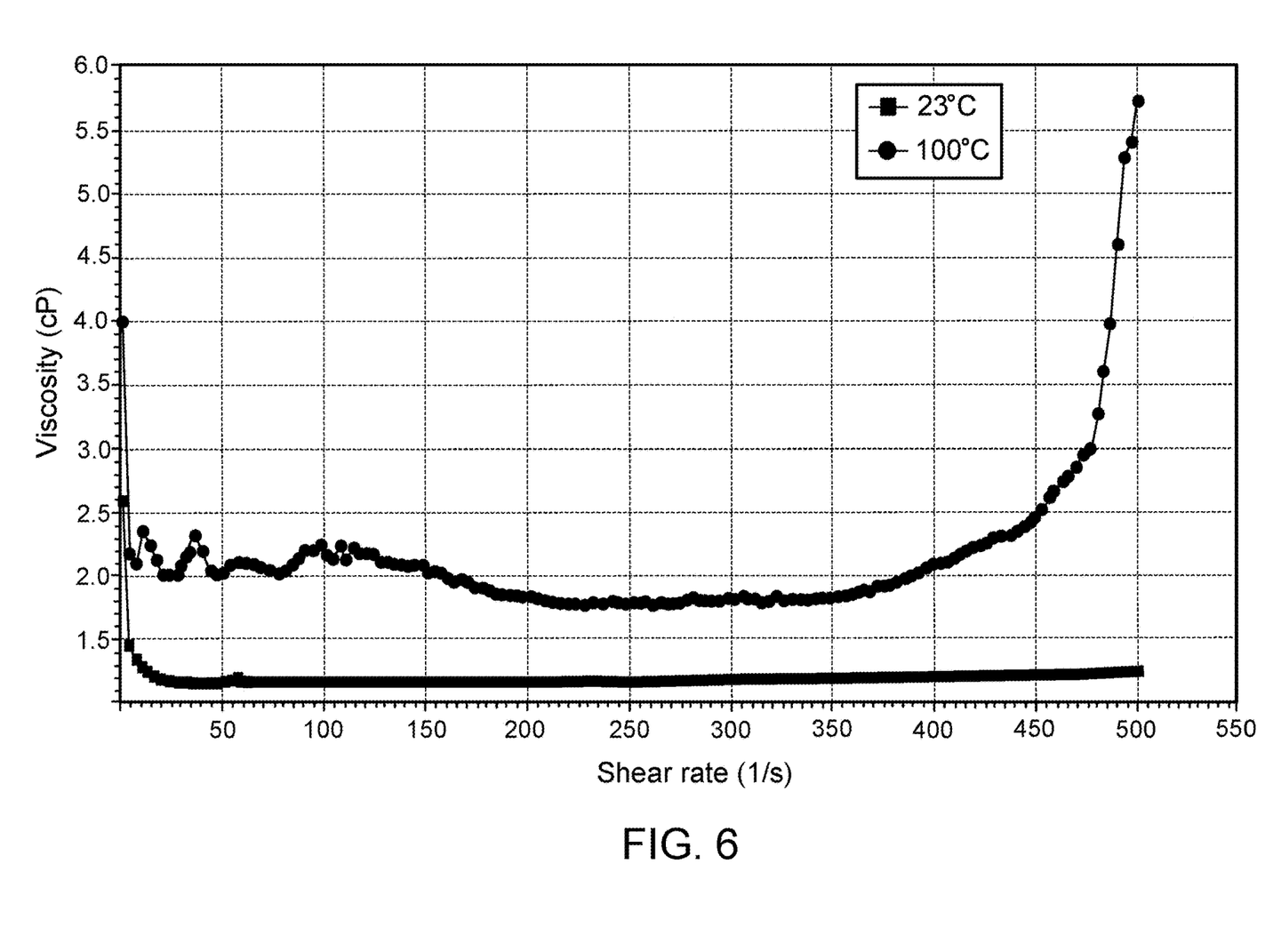
FIG. 6 is a graph of viscosities of an aqueous colloidal dispersion of nanomaterial at different temperatures with various shear rates applied.

2.0 g of 1 µm silica particles were dispersed in 20 mL of ethanol solvent. A quantity of a coupling agent including silane and PEG and a quantity of (3-aminopropyl)triethoxysilane (APTES) were added to the dispersion to satisfy a mass ratio of 8:1, respectively, followed by an addition of 1 mL of water in order to dissolve the coupling agent including silane and PEG. The dispersion was then stirred for 12 hours at room temperature (approximately 23° C.) and then stirred for 5 hours at 80° C. The dispersion was cooled to room temperature (approximately 23° C.) and centrifuged at 5,000 rpm for 5 minutes to cause the precipitate to separate from the supernatant, and then the supernatant was discarded. The precipitate was re-dispersed in 20 mL of water, and an excess of histidine was added. The mixture of particles, water, and histidine was refluxed for 12 hours in order to dehydrate (that is, remove water from) the particles and then cooled to room temperature (approximately 23° C.). FIG. 6 shows a data graph plotting the viscosities of the prepared colloid at room temperature (approximately 23° C.) and at 100° C. at various shear rates.

While this specification contains many specific implementation details, these should not be construed as limitations on the scope of the subject matter or on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example implementations do not define or constrain this disclosure. Other changes, substitutions, and alterations are also possible without departing from the spirit and scope of this disclosure.

What is claimed is:

1. A composition comprising an aqueous colloidal dispersion of a nanomaterial including, disposed on a surface thereof:
   a first coupling agent comprising a silane having a functional group comprising an amino acid, and
   a second coupling agent comprising a silane coupled to a polymer with a molecular weight between 1,000 and 20,000; wherein the aqueous colloidal dispersion is a shear-thickening material.

2. The composition of claim 1, wherein the amino acid is a polar amino acid.

3. The composition of claim 1, wherein the polymer is polyethylene glycol or polyethylene oxide.

4. The composition of claim 1, wherein a potential of hydrogen (pH) of the aqueous colloidal dispersion is in a range of 9 to 10.

5. The composition of claim 1, wherein heating the aqueous colloidal dispersion to a temperature above 90 degrees Celsius (° C.) causes a viscosity of the aqueous colloidal dispersion to reversibly increase by a factor of 1.5 to 15.

6. The composition of claim 1, wherein applying a shear on the aqueous colloidal dispersion causes a viscosity of the aqueous colloidal dispersion to reversibly increase by a factor of 1.1 to 3.

7. The composition of claim 1, wherein a ratio between the first coupling agent and the second coupling agent disposed on the surface of the nanomaterial is between 1:1 and 20:1.

8. The composition of claim 1, wherein the nanomaterial comprises silica nanoparticles having an average particle size of equal to or less than approximately 1 micrometer (µm).

9. The composition of claim 8, wherein the silica nanoparticles have an average particle size in a range of 60 nanometers (nm) to 1,000 nm.

* * * * *